United States Patent

[11] 3,621,000

[72] Inventors Hans-Georg Schmelzer
New Martinsville, W. Va.;
Hermann Gruber, Leverkusen; Eberhart Degener, Leverkusen; Wilfried Zecher, Stammheim, Germany
[21] Appl. No. 786,427
[22] Filed Dec. 23, 1968
[45] Patented Nov. 16, 1971
[73] Assignee Farbenfabriken Bayer Aktiengesellschaft
Leverkusen, Germany
[32] Priority Jan. 2, 1968
[33] Germany
[31] P 16 94 237.3

[54] A PROCESS FOR THE PRODUCTION OF CROSS-LINKED ELASTOMERS FROM BLOCKED ISOCYANATE-CONTAINING PREPOLYMERS
6 Claims, No Drawings

[52] U.S. Cl............................................. 260/77.5 AM,
260/18 TN, 260/30.6 R, 260/30.8 R,
260/31.2 N, 260/31.4 R, 260/32.8 N, 260/33.6 UB, 260/33.8 UB, 260/37 N, 260/45.95, 260/77.5 TB

[51] Int. Cl........................................................ C08g 22/32
[50] Field of Search........................................... 260/77.5
AT, 77.5 AM, 75 TN

[56] References Cited
UNITED STATES PATENTS
3,267,078  8/1966  Damusis.................... 260/77.5

Primary Examiner—Donald E. Czaja
Assistant Examiner—M. J. Welsh
Attorney—Robert A. Gerlach ABSTRACT: Cross-linked synthetic resins are prepared by heating to a temperature of from 60° to 180° C. a mixture of (A) a linear or branched polymerization or polycondensation product containing blocked isocyanate groups and (B) a bi- or polyfunctional ketimine or enamine. The cross-linked resins are useful as sheet structures, coverings, coatings, ceiling compositions, shaped articles and films of various types.

A PROCESS FOR THE PRODUCTION OF CROSS-LINKED ELASTOMERS FROM BLOCKED ISOCYANATE-CONTAINING PREPOLYMERS

Among the many methods available for producing elastic, cross-linked synthetic resins by the isocyanate polyaddition process are both the single stage processes, such as the casting process, and processes in which preadducts which contain terminal isocyanate groups are produced by reaction between polymerization or polycondensation products, which preferably contain hydroxyl groups, and di- or polyisocyanates in a first stage, the prepolymers then being hardened with cross-linking agents to yield the finished synthetic resin in a second stage. The production of the isocyanate-containing preadducts which are also known as isocyanates prepolymers, which generally make up the major proportion of the reactants has already been carried out quantitatively in a controlled manner. Additives, such as fillers, pigments, thickeners plasticizers and solvents may now be added to the prepolymer which serves as binder, and the final cross-linking may be carried out at any time thereafter, at room temperature or at elevated temperatures, after the addiiton of or in the presence of one of the usual cross-linking agents. The use of the isocyanate prepolymers makes the incorporation of additives much simpler and, owing to the fact that the viscosity of the prepolymers can be adjusted as desired within a very wide range, it also allows a much wider choice of shaping processes, e.g. painting, trowelling and application with doctor blades, for the production of coverings, coatings and sealing compositions, than would be possible when using a single stage process, or using the high molecular weight thermoplastic intermediates in the production of polyurethane elastomers.

Isocyanate prepolymers are, known to be extremely sensitive to moisture and impurities and are therefore stable in storage for only a limited time. Even traces of moisture and of impurities which may catalytically initiate polymerization and cross-linking reactions lead to an undesirable increase in the viscosity of the system. This causes particular difficulties when using additives which one cannot readily obtain completely free from water, and which are only of a commercial degree of purity and therefore require expensive drying and purification if they are to be used in the production of stable mixtures with the isocyanate prepolymers.

The cross-linking agents used have in many cases been compounds which contain hydroxyl groups. Whereas mixtures of the isocyanate prepolymers with these compounds which contain hydroxyl groups and are not stable in storage and cannot be used in this form as one-component systems, such combinations are often too inert for rapid cross-linking, in which case they must be catalysed. Traces of water would then produce bubbles in the cross-linked products. Apart from carrying out cross-linking with hydroxyl-containing compounds, particularly for hardening the resin at room temperature, cross-linking with water, in particular with atmospheric moisture, is often employed. Since this process proceeds slowly under normal atmospheric conditions (20° C. and 65 percent relative humidity), the carbon dioxide in the process can escape from thin layers of the resin material. In the case of thicker layers and shaped articles, this cross-linking results in products which have bubbles.

Carrying out cross-linking of the isocyanate prepolymers with di- or polyamines would for many reasons be preferable to carrying out cross-linking with hydroxyl-containing compounds or water. It would lead to the formation, without the need to use a catalyst, of urea bonds which are more stable to heat and hydrolysis than urethane bonds, and, moreover, this would take place without the evolution of carbon dioxide which occurs when water is used as cross-linking agent and which causes the formation of bubbles in cross-linked products which are of substantial thickness. However, the reaction between isocyanate groups, and primary or secondary amine generally proceeds so vigorously, in fact practically spontaneously, that the use of amines to harden systems which contain isocyanate groups is quite impossible in most fields of application. Even when particularly inert amines, such as sterically hindered amines are used, the pot life of the mixtures is, for many purposes, too short.

French Pat. Nos. 1,393,412 and 1,461,924 describe the use as cross-linking agents of polyaldimines and polyketimines or diketiminines in the presence of water or atmospheric moisture instead of di- or polyamines, in order to achieve bubble-free cold hardening of isocyanate prepolymers. When water enters the reaction mixture, the aldimines or ketimines hydrolyse to the free amines which bring about cross-linking of the isocyanate prepolymers. Even these combinations, which are extremely sensitive to moisture, have a pot life which is too short at room temperature for many purposes and with which complete hardening in moist air takes a considerable time, especially for a thick layer.

A particular requirement, in practice, of the production of cross-linked synthetic resins, including sheet structure, by the isocyanate polyaddition process relates to those combinations which remain highly stable at room temperature without the need to take special precautions and which can be rapidly cross-linked at elevated temperatures whenever required. One-component systems in which all the components, i.e. the binders, additives and cross-linking agents, are present in a stable mixture which is ready for use are praticularly preferred. It would, however, be a great advantage over the systems hitherto known if prepolymer and additives of the usual moisture content and degree of purity could be converted into a mixture which could be stored indefinitely and which after the addition of the cross-linking agent would have a pot life of at least several hours at room temperature and which, in addition, could be cross-linked within a few minutes at elevated temperatures.

The use of masked isocyanates, known as isocyanate splitters, instead of the isocyanates themselves in reactions carried out according to the isocyanate polyaddition process at elevated temperatures has already been described. These isocyanate splitters are thermally unstable compounds which yield free isocyanate groups on heating, which free isocyanate groups are capable of simultaneously reacting with the other reactants, such as polyols, which are present in the system. They are obtained by reacting the isocyanates with compounds which are capable of serving as masking agents, e.g. phenols, oximines, amides and compounds which contain CH-acidic hydrogen. The bond which is to be linked must in all cases be thermally more stable than the masked group. The splitting temperatures of numerous splitting compounds has been measured. Phenyl carbamate or compounds which split off phenol, for example, split at 180° C., and acetyl acetone splits at 140° C. In spite of their comparatively high splitting temperatures, only the phenol splitters have hitherto become important on an industrial scale. A typical example of these splitters is the reaction product of the triisocyanate of 3 mols of toluylene diisocyanate and 1 mol of 1,1,1-trimethylolpropane with 3 mols of phenol, which reaction product is used on a large scale in the industrial production of lacquers, in combination with polyseter polyols.

The isocyanate prepolymers when reacted with suitable masking agents show a high degree of insensitivity to moisture and impurities in contrast to the isocyanate prepolymers, themselves. They can be converted into highly stable mixtures in combination with additives such as fillers, pigments, thickeners, plasticizers and solvents having the usual moisture content and commercial degree of purity. They are therefore eminently suitable for use as binders in the production of the synthetic resins and sheet structures.

Masked isocyanates, however, only behave as true thermal isocyanate splitters with compounds which contain hydroxyl groups. They vary considerably in their reactions with amines. Isocyanates which have been masked with phenol or with ethyl acetate, for example, react exothermically with aliphatic amines at room temperature and in some cases very vigorously. The actual splitting reaction to liberate the free isocyanate, which proceeds at a measurable velocity only at elevated temperatures, is preceded by an aminolysis reaction which is catalysed by the amine. However, whereas phenyl carbamates are cross-linked by this reaction, ethyl acetate adducts are practically impossible to cross-link with amines even at elevated temperatures. The pot lives of the mixtures of isocyanate prepolymers which have been blocked with phenols and polyamines are therefore too brief for adequate working up, owing to the very rapid aminolysis reaction. In particular, the viscosity of the mixtures increases very rapidly. Furthermore, the cross-linked products obtained from such reaction mixtures are not as satisfactory in their physical properties as would be expected from a product which has been cross-linked with amines, apparently because the nature and degree of cross-linking do not occur in an ideal manner when the reaction proceeds so rapidly.

A process whereby isocyanate prepolymers which are blocked with phenol, cresol, ethyl acetate, cyclohexanone, oxime or isopropanol are cross-linked with diimines, preferably diketiminies, in the presence of moisture at low temperatures, for use in the production of coatings is described in British Pat. No. 1,031,917 . These combinations are stable in the complete absence of water. The rate of cross-linking at low temperatures e.g. at 20° C., depends on the moisture content of the surroundings. This cross-linking reaction is clearly caused by the free amines which, as has already been described in the case of the combinations of isocyanate prepolymers and imines, are formed by hydrolysis of the ketimines owing to the atmospheric moisture. Complete cross-linking of the coatings described in British Pat. No. 1,031,917 takes several hours at 20° C. and 50 percent relative humidity. Thicker layers, and in particular, shaped articles produced in this manner would require days or even weeks for complete hardening.

It is one object of the invention to provide a process for the preparation of cross-linked synthetic resins. Another object of this invention is to provide a process for the preparation of sheet structure.

The foregoing object and others which will become apparent from the following description are accomplished in accordance with this invention, generally speaking, by providing a process for the preparation of cross-linked synthetic resins, including sheet structures, which comprises heating mixtures of (a) linear and/or branched polymerization and/or polycondensation products which contain isocyanate groups which are masked by phenols, thiophenols or heterocyclic mercapto compounds and (b) bi- and/or polyfunctional ketimines and/or enamines to temperatures of 60° to 180 ° C, preferably 100° to 150° C.

The mixtures used are stable when stored at room temperature with complete exclusion of moisture and can be completely cross-linked within a few minutes, even in the case of very thick layers, if cross-linking is carried out at elevated temperatures in the absence of moisture. This process is therefore not confined to coatings but can be used in the production of, for example, coatings and films of practically any thickness, sealing compositions and, in particular shaped articles of relatively large dimensions. Synthetic resins and sheet structures obtained in this way invariably have excellent physical properties. The quality of the products of the invention, even of thick layers and shaped articles, equals that found in coatings which have been hardened in the presence of moisture and in the cold according to the method described in British Pat. No. 1,031,917 and in many cases is even superior to it. This is particularly surprising since the last-mentioned products are hardened by cross-linking with amines which is well known to be a better cross-linking method than any other type of cross-linking method. In contrast the products of the process according to the invention are obviously not cross-linked by free amine, owing to the absence of water. At the same time, the mixtures according to the invention, of masked isocyanates and ketimines and/or enamines meet all the requirements mentioned above in connection with the stability under storage conditions at the low temperatures which are necessary for optimum use as a one-component or two-component system. When moisture is completely excluded, the ready-for-use mixtures of masked isocyanates and ketimines and/or enamines and, if desired, additives are sufficiently stable under storage conditions to enable them to be used as a one-component system. In addition, the masked isocyanate prepolymers can be mixed with additives having the usual moisture content and commercial degree of purity to produce mixtures which show excellent stability during storage and which quantitatively constitute the major portion of the total mixture of components and have sufficiently long pot lives after the addition of the ketimines and/or enamines to enable them to be worked up by the process according to the invention.

The present invention therefore relates to a process for the production of cross-linked synthetic resins, including sheet structures, which is characterized in that mixtures of (a) linear and/or branched polymerazition and/or polycondensation products which contain isocyanate groups which are masked by phenols, thiophenols and heterocyclic mercapto compounds and (b) bi- and/or polyfunctional ketimines and/or enamines are heated to temperatures of 60° to 180° C., preferably 100 to 150° C.

The step of hardening the masked isocyanate prepolymers with ketimines and/or enamines by application of heat in the process according to the invention cannot by applied generally to all isocyanates splitters, and depends on the masking agent used. For example, isopropanol and ethyl acetate are blocking agents mentioned in British Pat. No. 1,031,917 which cannot be used in the process according to the invention. Maskings agents which are suitable for use in the process according to the invention are phenols, thiophenols, and heterocyclic mercapto compounds. The thiophenols and heterocyclic mercapto compounds used, in practice, are preferably odorless SH compounds. Phenols and heterocyclic mercapto compounds are preferably used as blocking agents.

Surprisingly, the bi- or polyfunctional enamines which have hitherto not been described for use as cross-linking agents for masked isocyanates are as effective as the ketimines and have the advantage when used in the process according to the invention over ketimines that they are less sensitive to hydrolysis and therefore suitable for use in the production of reaction mixtures which are especially suitable during storage.

The linear and branched polymerization of polycondensation products containing masked terminal isocyanate sulfhydryl which are used in the process according to the invention may be obtained by known processes. These products are preferably prepared by reacting the corresponding isocyanate-containing polymerization or polycondensation products with the masking agents, preferably in stoichiometrical proportion, if desired at elevated temperatures and with the use of the usual catalysts such as tertiary amines and/or tin compounds. The isocyanate-containing polymerization or polycondesnation products (isocyanate prepolymers) in turn can be prepared by reacting the corresponding hydroxyl-, amino- or sulphhydryl-containing polymerization or polycondesnation products, preferably, the usual hydroxyl -containing polyethers, polythioethers, polyesters, polyacetals, polycarbonates or polyester amides, with di- or polyisocyanates, e.g. in an NCO/OH ratio of 0.6:1 to 1.5:1 or with a large excess of isocyanate, followed by removal of the excess isocyanate, e.g. by thin layer distillation.

The linear and/or branched polymerization and/or polycondensation products containing, for example, hydroxyl and/or sulfhydryl groups and/or primary and/or secondary amino groups preferably contain, inter alia, hydroxyl groups and have molecular weights of preferably 150 to 10,000 .

The following are examples of these products: Polyether polyols which are obtained by anionic polymerization, copolymerization or block copolymerization of alkylene oxides such as ethylene oxide, propylene oxide and butylene oxide with bi- or polyfunctional alcohols such as butane-1,4-diol, 1,1,1-trimethylolethane, 1,1,1-trimethylolpropane, hexane-1,2,6-triol, glycerol, pentaerythritol and sorbitol, or their alkyl metal alcoholates, or with amines such as methylamine, ethylene diamine and 1,6-hexamethylenediamine as starting components. The polyether polyols may also be obtained by cationic polymerization or copolymerization of cyclic ethers such as tetrahydrofuran, ethylene oxide and propylene oxide using acid catalysts such as boron trifluoride etherate or by polycondensation of glycols which can be polycondensed with elimination of water, such as hexane-1,6 -diol, in the presence of acid etherification catalysts such a p-toluene sulfonic acid if, for example, one wishes to impart a flame-proofing effect, hydroxyalkylation products of phosphoric acid and phosphonous acids, e.g. with ethylene oxide, propylene oxide, butylene oxide and styrene oxide may be used. The polythioether polyols used include, in particular, the polycondensation products of thiodiglycol with itself and with diols and/or polyols such as hexane-1,6 -diol, triethylene glycol, 2,2 -dimethylpropane-1,3 -diol, and 1,1,1 -trimethylol propane obtained using acid etherification catalysts search as phosphoric acid and phosphorous acid. The polyacetals used are preferably polycondensation products of formaldehyde and diols and/or polyols such as diethylene glycol, triethylene glycol, butane-1,4-diol, hexane-1,6-diol, thiodiglycol and 1,1,1-trimethylolpropane, obtained using acid catalysts such as phosphoric acid p-toluene sulfonic acid. The polyester polyols are preferably condensation products of di- and/or polycarboxylic acids and di- and/or polyols which are prepared by polycondensation, e.g. of adipic acid, phthalic acid, tetrahydrophthalic acid, hexahydrophthalic acid and endomethylene tetrahydrophthalic acid with ethylene gylcol, butane-1,4-diol, diethylene glycol, triethylene glycol, hexane-1,6-diol, 2,2-dimethylpropane-1,3-diol, 1,1,1-trimethylolpropane and hexane-1,2,6-triol. In this last-mentioned group one may also use polycarbonates of the above-mentioned di- and polyols and polymerization products of lactones such as ε-caprolacatone. Suitable polyester amides are the polycondensation products of di- and/or polycarboxylic acids, e.g. the dicarboxylic acids mentioned with respect to the preparation of polyester polyols, and amino alcohols such as ethanolamine, or mixtures of amino alcohols or polyamines or amino carboxylic acids with di- and/or polyols, e.g. with the di- and polyols mentioned among the polyester polyols.

The above-mentioned polymerization and polycondensation products are converted into isocyanate-containing, so-called isocyanate prepolymers with di- and/or polyisocyanates in known manner. If additional chain-lengthening reactions via urethane groups can be carried out, which may be preferred, the hydroxyl-containing polymerization or polycondensation products may be reacted with the di- or polyisocyanates in an NCO/OH ratio of 0.6:1 to 1.5:1, preferably 0.7:1 to 0.9:1, if desired first at 0° to 25° C. with cooling and later, if desired, for several hours with heating. If a chain-lengthening reaction is not required, a substantially greater excess of di- or polyisocyanate is used, preferably one calculated for an NCO/OH ratio of 3–5:1, and the procedure is otherwise the same as for the low NCO/OH ratios. The excess di- or polyisocyanate is subsequently removed, e.g. by thin layer distillation in the case of di- or polyisocyanates which can be distilled, or in the case of isocyanates which cannot be distilled, they may be removed by solvent extraction.

The following are examples of suitable di- or polyisocyanates: Toluylene-2,4-diisocyanate and commercial mixtures thereof with toluylene-2,6-diisocyanate, toluylene-2,6-diisocyanate, diphenylmethane-4,4'-diisocyanate, hexamethylene-1,6-diisocyanate, napthylene-1,5-diisocyanate, m-xylylene diisocyanate, 1-methyl-2,4-diisocyanate-cyclohexane, isophorone diisocyanate, 2,4,4-trimethyl-1,6-diisocyanatohexane, 2,2,4-trimethyl-1,6 diisocyanatohexane, dimeric toluylene-2,4-diisocyanate, N,N'-di-(4-methyl-3-isocyanato-phenyl)-urea, N,N', N" -tri-(6isocyanatohexyl)-biuret, triphenylmethane-4,4'''-triisocyanate, the reaction product of 3 mols of toluylene-2,4-diisocyanate and 1 mol of 1,1,1-trimethylolpropane, trimerization and polymerization products of toluylene-2,4-diisocyanate, mixed trimerization and mixed polymerization products of toluylene-2,4-diisocyanate and hexamethylene-1,6-diisocyanate, mixtures of isomeric diphenylmethane diisocyanates, and polyisocyanates and diisocyanates which have a diphenylmethane structure and contain more than two benzene rings linked via methane groups, the isocyanate groups of which polyisocyanates and diisocyanates have been partly converted into carbodiimide groups.

The isocyanate-containing polymerization of polycondensation products which have been prepared from these components by known processes are then reacted in known manner with the masking agents, preferably in stoichiometrical quantities. This reaction is advantageously carried out at elevated temperatures, preferably at 50° to 120° C., and if desired using the catalysts customarily used in isocyanate chemistry, e.g. tertiary amines and/or compounds of divalent and tetravalent tin.

The preparation of the isocyanate-containing polymerization and polycondensation products may be carried out in bulk or in solvents which are inert to isocyanates. Any solvents used may be removed by distillation, preferably by thin layer distillation, after the reaction is complete. However the solution of the isocyanate prepolymers are preferably used directly in the next stage.

Suitable solvents include esters such as ethyl acetate, butyl acetate, methyl glycol acetate and ethyl glycol acetate; ketones such as methyl ethyl ketones and methyl isobutyl ketone; aromatic compounds such as toluene and xylene and mixtures of higher aromatic compounds, as well as mixtures of these solvents.

The hydroxyl-containing chain-lengthening agents customarily used for reactions of the isocyanate polyaddition may be included in the preparation of the isocyanate-containing bifunctional and polyfunctional polymerization or polycondensation products. In addition to carrying out a chain-lengthening reaction, branching of polymerization and polycondensation products which are themselves only bifunctional via urethane groups may be carried out, e.g. with the aid of polyfunctional chain-lengthening agents. The viscosity of the isocyanate prepolymers may be increased to the desired extent by means of the increased urethane group content which is obtained by using chain-lengthening agents.

In principle, any chain-lengthening agents may be employed, but hydroxyl-containing compounds such as butane-1,4-diol, 1,1,1-trimethylolpropane and hydroquinone-di-(2-hydroxyethylether) are preferred.

Suitable catalysts, which are used in quantities of 0.0001 to 2 percent, include diazabicyclooctane, dibutyl tin dilaurate and tin(II)-octoate.

The following compounds are examples of phenols which may be used as masking agents for preparing the linear and branched polymerization or polycondensation products containing masked isocyanate groups which are used in the process according to the invention: Phenol, o-, m- and p-cresol, cresol mixtures, isomeric xylenols, 2-sec.-butylphenol, 4-tertiary-butylphenol, 4-(1,1,3,3-tetramethyl-butyl)-phenol, 4-cyclohexylphenol, mixtures of 4-nonylphenols which have branched nonyl radicals, dodecylphenol mixtures such as can be prepared, for example, by the addition of suitable olefines to phenols in the presence of Friedel-crafts' catalysts, amyl phenol, hexyl phenol, heptyl phenol, 4-nitrophenol, 4-chlorophenol, pentachlorophenol, α- and β-naphthol and methyl 4-hydroxybenzoate, n-butyl 4-hydroxybenzoate and 2-ethyl-hexyl-4-hydroxybenzoate.

Phenol and phenols which are substituted by alkyl radicals which contain one to three carbon atoms are given off by the products of the process. This may cause an unpleasant smell as well as a physiological risk and a disadvantageous decrease in bulk. Thus, in order to prevent these disadvantages, other phenol derivatives are preferably used as masking agents for the preparation of the masked isocyanate prepolymers used according to the invention which remain in the products after cross-linking, owing to their low vapor pressure. These phenol derivatives include phenols which are substituted by $C_4$ to $C_{18}$ alkyl radicals and hydroxybenzoic acid esters of $C_4$ to $C_{18}$ alcohols. These phenol derivatives at the same time have the advantage of acting as plasticizers for the product of the process. In addition, the phenols which are substituted by alkyl radicals containing 4 to 18 —carbon atoms, which phenols are advantageously used as masking agents, have the further advantage, e.g. over phenol, when used in two component systems that the mixtures of blocked isocyanate prepolymers and ketimines and/or enamines have a longer pot life.

Pentachlorothiophenol, 2-mercaptothiazoline, 2-mercaptobenzimidazole and 2-mercaptobenzoxazole are examples of suitable thiophenols and heterocyclic mercapto compounds which may be used in the preparation of the masked isocyanate prepolymers which can be used according to the invention.

Monocyclic heterocyclic mercapto compounds such as 2-mecaptothiazoline are especially suitable for use as masking agents because they are completely odorless and yet have a relatively low molecular weight which makes them highly compatible with the isocyanate prepolymers.

The polymerization and polycondensation products which contain masked isocyanate groups, which polymerization and polycondensation products are to be used in the process according to the invention, may be prepared as aryl carbamates or thiol carbamates not only by the process which is described in detail here and which is preferably employed but, of course, by other processes which are known per se. For example, they may be obtained by reacting linear or branched polymerization or polycondensation products which contain primary or secondary amino groups with phosgene, to produce the corresponding carbamic acid chlorides which may then be reacted with, for example, the sodium salts of the above-mentioned phenols or mercapto compounds to produce the aryl carbamates or thiol carbamates in a second stage. Polymerization or polycondensation products which contain amino groups may also be reacted with the chloroformates of the corresponding phenols or with the thiocarbonyl chlorides of the mercapto compounds in the presence of hydrogen chloride acceptors to yield phenyl carbamates or thiol carbamates in a single stage.

Di- or polyfunctional ketimines and enamines which may be used are the condensation products which are obtained by the condensation of aliphatic, cycloaliphatic, araliphatic and aromatic di- or polyamines which contain primary and/or secondary amino groups, with aliphatic, cycloaliphatic, araliphatic, aromatic and aliphatic-aromatic ketones with splitting off of water. They may advantageously be prepared by, for example, continuously removing the water of condensation from the reaction mixture by azeotropic distillation as it is formed.

This condensation reaction generally does not require catalysis. The removal of water is advantageously carried out by azeotropic distillation which is achieved by reacting stoichiometrical quantities of amines and ketones in a suitable solvent such as benzene, toluene or xylene at the boiling point of this solvent.

Di- or polyamines containing primary and/or secondary amino groups which may be used in the preparation of the ketimines and enamines include, in particular, those which contain saturated or unsaturated, linear or branched aliphatic hydrocarbon radicals with two to 36 carbon atoms, cycloaliphatic hydrocarbon radicals with preferably six carbon atoms in the ring, araliphatic hydrocarbon radicals with benzyl, xylylene, diphenylmethane and tolyl groups, and aromatic hydrocarbon radicals which preferably contain benzene rings, as well as those amines which contain carbonamide groups. The following compounds are given as specific examples: Ethylene diamine, hexamethylene-1,6-diamine, diethylene triamine, 4,4'-diamino-diphenylmethane, toluylene-2,4-diamine and toluylene-2,6-diamine and mixtures of these isomers, xylylene-1,3-diamine, 1-methyl-2,4-diamino-cyclohexane, isophorone diamine, 2,4,4-trimethyl-1,6-diaminohexane, 2,2,4-trimethyl-1,6-diaminohexane, 2,5-dimethyl-piperazine, N,N'-diisobutyl-hexamethylene diamine, N,N'-dibenzyl-hexamethylene diamine, N,N'-dimethyl-ethylene diamine, as well as the usual commercial polyamines which contain primary and secondary amino groups and carbonamide groups.

Particularly suitable ketones are those which contain two identical or two different linear and/or branched aliphatic hydrocarbon radicals with one to 18 carbon atoms or one such hydrocarbon radical in the form of a ring, or aromatic hydrocarbon radicals, especially phenyl radicals. The following are examples of individual ketones: Methyl ethyl ketone, diethyl ketone, methylisobutyl ketone, diisobutyl ketone, cyclohexanone and acetophenone.

The polymerization of polycondensation products containing masked isocyanate groups and the ketimines and/or enamines which are to be used according to the invention are generally mixed in the proportion of 0.5 to 2 equivalents of ketimines or enamine per masked isocyanate group, depending on the desired degree of cross-linking, but preferably in stoichiometrical proportions. In order to prepare the mixtures ready for use, which mixtures optionally include additives such as fillers, pigments, solvents, plasticizers thickeners, drying agents and age resistors, one may use, for example, the processes and machines generally employed in the lacquer industry. For the one-component systems, the components must be free from water, and preparation of the mixtures and filling them into suitable containers must be carried out with exclusion of moisture. When two-component systems are used, preliminary mixtures which are extremely stable during storage can be prepared very advantageously without taking any special precautions, from the masked isocyanate prepolymers and, if desired, additives, which additives may be moist and need only be of a commercial degree of purity. In this case it is only necessary to add the ketimine or enamine component to the preliminary mixtures before use.

The following are examples of fillers and pigments which may be used for producing the products of the process: Quartz sand, quartz powder, kaolin, talcum, chalk, asbestos powder, stearates and minerals which have been treated with stearates, titanium dioxide, chromium oxide and iron oxide.

Suitable solvents which may be used in quantities of up to —75 percent by weight but which are preferably used in quantities of less than 25 percent by weight, based on the total mixture, to adjust the viscosity to a desired value are those of the type already mentioned. One should preferably, however, work without solvent.

The following compounds are examples of plasticizers which may be included in the products prepared by the process of the invention: Phthalates such as diemthyl, diethyl and dibutyl phthalate, phosphates such as tricresyl phosphate and polyether thioethers such as the condensation product of thiodiglycol and triethyleneglycol-mono-n-butyl ether and chlorinated diphenyls. Suitable thickening agents include colloidally dispersed silicic acid, hydrogenated castor oil and bentonite.

The following are examples of suitable drying agents: Molecular sieve zeolite, aluminum alcoholates such as aluminum n-butylate and aluminum isopropylate; titanium alcoholates such as titanium tetrabutylate; orthoformic acid esters, and mono- and bifunctional isocyanates such as p-toluenesulphonyl isocyanates and diphenylmethane-4,4'-diisocyanate.

Suitable age resisting agents include 4-tertiary-butyl-pyrocatechol, 2,6-di-tertiary-butylphenol, 2,6-di-tertiary-butyl-4-methylphenol and ionol.

Catalysts may be used in the process according to the invention. Suitable catalysts include tertiary amines such as 1,4-diaza-bicyclo(2,2,2)-octane and organic tin compounds such as tin(II)-octate and dibutyl tin-dilaurate.

The mixtures are cured at temperatures of 60° to 180° C., preferably 100° to 150° C. As the temperature curves in the examples which follow indicate, the rate of cross-linking can be adjusted as desired within a wide temperature range. In particular, curing can be achieved within a few minutes at the higher temperatures within the given limits, so that, for example, the process according to the invention enables coatings to be applied continuously.

The cross-linked synthetic resins, which include sheet structures such as coverings, coatings, sealing compositions, shaped articles and films of all sorts of different types, which can be produced by the process according to the invention by heat hardening the mixtures of linear and/or branched polymerization or polycondensation products which have masked terminal isocyanate groups, bi- and/or polyfunctional ketimines and/or enamines, and additives if desired, have the well known desirable and commercially valuable properties of polyurethane elastomers. These properties can be adapted to the purpose for which the products are to be used owing to the wide possible range of variation of the components. At the same time, the process provides for a wide range of application of the products by virtue of the fact that the physical properties of the mixture which are ready for use can also be varied to a great extent.

Thus, for example, the viscosity of the mixtures can be adjusted to any desired values within wide limits so that the products can be applied by painting, spraying, immersion, extrusion, spreading with wiper blades or trowels and calendering, using the conventional tools and machines for these methods. One special advantage of the components used in the present invention is that they can easily be worked up by the technique employed for PVC plastisols.

EXAMPLE 1 a. Preparation of a trifunctional polyether which contains terminal isocyanate groups masked by 4-nonylphenol. 1,000 g. of a trifunctional polypropylene glycol of OH number 56 which has been obtained by known methods by anionic polymerization of propylene oxide with 1,1,1 -trimethylolpropane or its sodium alcoholate as starting component and 150 g. of toluylene-2,4-diisocyanate are mixed at 20° to 25°C. The mixture is heated at 70°C. for 5 hours with stirring, and at the end of this time, it has an NCO content of 3 percent by weight. 5 g. of dibutyl tin dilaurate and 190 g. of a commercial mixture of 4-nonylphenol which contains branched nonyl radicals are added to the isocyanate prepolymer when this has been cooled to 20° to 25° C. The reaction mixture is then heated at 75°C. for another 4 hours with stirring. The product obtained is practically free from isocyanate and has an equivalent weight of about 1,630.

b. Preparation of 1,6-di-(cyclohexylidene-imino)-hexane

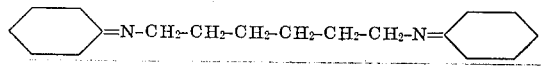

196 g. (2 mols) of cyclohexanone and 116 g. *(1 mol) of hexamethylene-1,6-diamine are heated under reflux in 500 ml. of toluene and the water of condensation formed is continuously removed from the reaction mixture by means of a suitable apparatus. Most of the water has been removed by the end of about 6 hours. To ensure complete removal of the remaining water, condensation is continued under reflux for another 6 hours. The toluene is then distilled off, first at normal pressure and then under vacuum. 1,6-Di- (cyclohexylidene-imino)-hexane sufficiently pure for use in the present invention remains behind practically quantitative yield.

c. Process according to the invention

One hundred Parts by weight of the polyester with terminal 4-nonylphenylcarbamate groups which has been prepared according to (a) are mixed with 10 parts by weight of titanium dioxide rutile, 20 parts by weight of calcium carbonate and 30 parts by weight of dehydrated alumina. A planetary mixer fitted with vacuum device is used to distribute the fillers and pigments homogeneously so that the mixture can at the same time be freed from occluded air at a pressure of 0.5 mm. Hg. The mixture obtained in this way is stable during storage in spite of the use of additives which have the usual moisture content and are only pure to a commercial extent. Eight parts by weight of 1,6-di-(cyclohexylidene-imino)-hexane which has been prepared according to (b) are added to give a mixture which can be hardened on heating. A paste which can be worked up for 24 hours at 20° to 25° C. is obtained, Circular discs of the paste, 8 cm. in diameter and 2 mm. in thickness, for example, are cross-linked after 15 minutes at 125° C. and after only 5 minutes at 150° C. Test samples are produced according to DIN 53455 to determine the properties (Buchmann rod 100=10×4 „.). The tests yield the following results:

| | |
|---|---|
| Elongation at break | 795 % |
| Tensile strength | 26.5 kg. wt./cm.2 |
| Shore hardness A | 43 |
| Tear propagation resistance 12 kg. wt./cm. | |

Tension at

| | |
|---|---|
| 100 % elongation | 7.4 kg. wt./cm.2 |
| 300 % elongation | 15 kg. wt./cm.2 |

EXAMPLE 2 a. Preparation of a bifunctional polyether which has terminal isocyanate end groups masked by 4-nonylphenol. 1,000 g. of a bifunctional polypropylene glycol of OH number 56 and 150 g. of toluylene-2,4-diisocyanate are mixed at 20° to 25+ C. and then heated to 70° C. for 10 hours with stirring. 2 g. of tin(II)-octoate and 165 g. of a commercial 4-nonylphenol mixture which has branched nonyl radicals are then added to the isocyanate prepolymer which has been cooled to 20° to 25° C., which isocyanate prepolymer has an NCO content of 2.6 percent by weight. A product which is practically free from isocyanate groups and which has an equivalent weight of about 1,850 is obtained after heating for 6 hours at 70° C., with stirring.

b. Preparation of N,N-di-(2-cyclohexylideneimino-ethyl)-cyclohexenyl-(1)-amine.

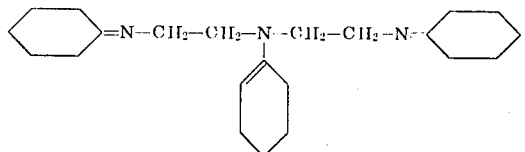

103 g. (1 mol) of diethylenetriamine and 294 g. (3 mols) of cyclohexanone are condensed under reflux in 700 ml. of toluene, the water formed during the reaction being continuously removed from the reaction mixture by azeotropic distillation. Condensation is completed after about 24 hours. A sufficiently pure N,N-di-(2 -cyclohexyl-idene-imino-ethyl)-cyclohexenyl-(1)-amine remains behind as an oil in practically quantitative yield after removal of the toluene by distillation.

c. Process according to the invention

One hundred Parts by weight of the blocked isocyanate prepolymer which has been prepared according to (a), 10 parts by weight of titanium dioxide rutile, 20 parts by weight of calcium carbonate and 30 parts by weight of dehydrated alumina are mixed together and deaerated in a planetary mixer. This mixture can be stored for an unlimited length of time. After the addition of 6.2 parts by weight of the diketiminoenamine prepared according to (b), a heat-hardenable composition is obtained which remains in a suitable state for working up for 24 hours at room temperature if fillers which have a normal moisture content and degree of purity are used. Circular discs of the composition which have a diameter of 8 cm. and a thickness of 2 mm. are cross-linked after heating for only 15 minutes, at 100° C. Standard tests samples (DIN 53 455 , Buchmann rod 100×10×4 mm.) are found to have the following properties:

| | |
|---|---|
| Elongation at break | 241 % |
| Tensile strength | 28 kg. wt./cm. 2 |
| Shore hardness A | 56 |

| | |
|---|---|
| Tear propagation resistance | 6.3 kg. wt./cm.2 |
| Tension at 100 % elongation | 17.0 kg. wt./cm.2 |

What is claimed is:

1. A process for the production of cross-linked synthetic resins which comprises heating at a temperature of from about 60° C. to about 180° C., with the exclusion of moisture, a mixture of (A) a prepolymer containing terminal isocyanate groups which are masked by a compound selected from the group consisting of phenols substituted by C4 to $C_{18}$ alkyl radicals, thiophenols, heterocyclic mercapto compounds and hydroxy benzoic acid esters of C4 to C18 alcohols, and (B) a polyketimine or a polyenamine.

2. The process of claim 1 wherein the prepolymer containing terminal isocyanate groups has a molecular weight of from about 150 to about 10,000 and is obtained by reacting a polyisocyanate with a member selected from the group consisting of hydroxyl containing polyethers, polythioethers, polyesters, polyacetals, polycarbonates and polyester amides.

3. The process of claim 1 wherein the polyketimine or polyenamine is present in an amount of from about 0.5 to about 2 equivalents per masked isocyanate group.

4. The process of claim 1 wherein the temperature is from about 100° C. to about 150° C.

5. The process of claim 1 wherein the polyketimine is 1,6 - di-(cyclohexylidene-imino)-hexane.

6. The process of claim 1 wherein the polyketimine is N,N-di-(2-cyclohexylideneimino-ethyl)-cyclohexenyl-(1)-amine.

* * * * *